United States Patent
Okano

(10) Patent No.: US 8,014,038 B2
(45) Date of Patent: Sep. 6, 2011

(54) FACSIMILE DEVICE

(75) Inventor: Tetsuya Okano, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 937 days.

(21) Appl. No.: 11/930,957

(22) Filed: Oct. 31, 2007

(65) Prior Publication Data

US 2008/0100865 A1 May 1, 2008

(30) Foreign Application Priority Data

Oct. 31, 2006 (JP) ................................. 2006-295456

(51) Int. Cl.
*H04N 1/00* (2006.01)

(52) U.S. Cl. ....... 358/400; 358/1.15; 358/474; 358/406; 709/203; 709/225; 399/367; 399/408

(58) Field of Classification Search .................. 358/474, 358/1.15, 403, 1.13, 1.18, 406, 412; 709/201, 709/203, 223, 225; 399/45, 21, 114, 16, 399/301, 408, 367

See application file for complete search history.

(56) References Cited

U.S. PATENT DOCUMENTS

| | | | |
|---|---|---|---|
| 6,424,429 B1 * | 7/2002 | Takahashi et al. | 358/1.16 |
| 6,792,224 B2 * | 9/2004 | Ueda et al. | 399/82 |
| 6,813,455 B2 * | 11/2004 | Asai | 399/82 |
| 6,862,114 B1 * | 3/2005 | Hayashi | 358/437 |
| 7,885,596 B2 * | 2/2011 | Iwago et al. | 399/367 |
| 2004/0190057 A1 * | 9/2004 | Takahashi et al. | 358/1.15 |
| 2006/0203289 A1 * | 9/2006 | Miyata | 358/1.18 |
| 2007/0086816 A1 * | 4/2007 | Iwago et al. | 399/367 |
| 2008/0181699 A1 * | 7/2008 | Ueda | 399/408 |
| 2008/0298821 A1 * | 12/2008 | Mori | 399/21 |

FOREIGN PATENT DOCUMENTS

| | | |
|---|---|---|
| JP | 8167953 A | 6/1996 |
| JP | 2001138583 A | 5/2001 |
| JP | 2002199195 A | 7/2002 |
| JP | 2002278692 A | 9/2002 |
| JP | 2004-104264 | 4/2004 |
| JP | 2005-037837 | 2/2005 |
| JP | 2005-047130 | 2/2005 |
| JP | 2006065726 A | 3/2006 |
| JP | 2006166214 A | 6/2006 |

* cited by examiner

*Primary Examiner* — Negussie Worku

(74) *Attorney, Agent, or Firm* — Banner & Witcoff, Ltd.

(57) ABSTRACT

A double-surface printing type facsimile device is provided with a storage configured to store image data of document data received by facsimile, a printing unit configured to print the image data stored in the storage in one of single-surface printing mode and double-surface printing mode on a recording sheet, the image data being printed on one surface and the other surface of the recording sheet subsequently when the printing unit operates in the double-surface printing mode, a backup memory configured to store only the image data to be printed on the other surface of the recording sheet, and a reprinting unit configured to reprint the image data stored in the backup memory in the single-surface printing mode.

12 Claims, 7 Drawing Sheets

FACSIMILE DEVICE

CROSS-REFERENCE TO RELATED APPLICATION

This application claims priority under 35 U.S.C. §119 from Japanese Patent Application No. 2006-295456 filed on Oct. 31, 2006. The entire subject matter of the application is incorporated herein by reference.

BACKGROUND

1. Technical Field

The present invention relates to a facsimile device capable of printing received images on both sides of a recording sheet.

2. Related Art

Conventionally, there has been known a double-surface printing type facsimile device which is capable of printing received image of an original on both sides of a recording sheet. An example of such a technology is disclosed in Japanese Patent Provisional Publication No. P2004-104264A (hereinafter, referred to as '264 publication).

FIG. 8 schematically shows a configuration of the double-surface printing facsimile device similar to one disclosed in '264 publication.

As shown in FIG. 8, the double-surface printing facsimile device includes, along a sheet feed path 110, a pair of feed rollers 107, a registration sensor 108, a pair of registration rollers 104, a photosensitive roller 103, a transfer roller 105 and a pair of fixing rollers 102. The sheet feed path 110 is connected with a reverse feed path 111. At a diverging point between the sheet feed path 110 and the reverse feed path 111, a diverging sensor 106 is arranged. Along the reverse feed path 111, on the downstream side of the diverging sensor 106, a pair of reverse rotation rollers 109 and a discharge sensor 101 are arranged. The feed rollers 107 and the reverse rotation rollers 109 are driven to rotate by a stepping motor 115.

With the above configuration, the double-surface printing is performed as described below.

Firstly, from a sheet feed cassette (not shown), one of recording sheets is picked up and fed toward the pair of feed rollers 107. During the feeding of the recording sheet, along the sheet feed path 110, toward the registration rollers 104, the leading edge of the recording sheet is detected using the registration sensor 108. In response to detection of the leading end of the recording sheet by the registration sensor 108, rotation of the registration rollers 104 is stopped so that the leading end of the recording sheet abuts the registration rollers 104 and its orientation is corrected (i.e., skew, or the inclination of the recording sheet with respect to the sheet feed direction is corrected).

Thereafter, rotation of the registration rollers 104 are restarted and the recording sheet is fed toward a nip between the photosensitive roller 103 and the transfer roller 105. At the nip therebetween, the image is transferred from the photosensitive roller 103 onto the recording sheet, and then the transferred image is fixed on the recording sheet with heat and pressure applied by the fixing rollers 102.

The recording sheet is then fed from the sheet feed path 110 to the reverse feed path 111. When the diverging sensor 106 detects the leading edge of the recording sheet, the reverse rotation rollers 109 are rotated so that the recording sheet is fed toward the discharge sensor 101.

When the recording sheet is fed in the reverse feed path 111, the front and back surfaces of the recording sheet are reversed with respect to a state when the recording sheet was picked up from the sheet feed tray.

When the discharge sensor 101 detects the recording sheet, the reverse rotation rollers 109 are reversely rotated so that the recording sheet is fed in a direction away from the discharge sensor 101. The recording sheet as reversed is fed from the reverse rotation rollers 109 toward the sheet feed rollers 107 (i.e., the recording sheet is fed from the reverse feed path 111 to the sheet feed path 110). As described above, at this stage the front and back surfaces of the recording sheet have been reversed.

As the recording sheet is fed toward the nip between the photosensitive roller 103 and the transfer roller 105, the surface bearing the previously transferred image faces the transfer roller 105, and a surface on which no image has been printed faces the photosensitive roller 103. Then, an image is transferred from the photosensitive roller 103 to the recording sheet, and fixed by the fixing rollers 102, thereby the double-surface printing has been completed. The recording sheet to which the double-surface printing has been applied is then fed toward the discharge sensor 101, and at this time, discharged onto the discharge tray 112.

If the double-surface printing facsimile device is configured to discharge the recording sheet with its back surface oriented upward (hereinafter, referred to as face-down state), an image of an even number page is printed firstly on one surface of the recording sheet, and then an image of an odd number page is printed on the other surface of the recording sheet.

Typically, such a double-surface printing type facsimile device is capable of printing images on both sides of the recording sheet as it receives facsimile data, or storing the received facsimile data in a storage, and then printing images based on the stored facsimile data. Specifically, the double-surface printing type facsimile device may be configured such that the image data for a first page is stored in a storage (e.g., a page memory) as the image data is received without printing the same on the recording sheet. Then, the facsimile device receives the image data for a second page, which is also stored in a storage (e.g., the page memory).

When the image data for both the first and second pages of the recording sheet is accumulated (stored) in the storage, images corresponding to the stored image data for the first and second pages are printed in a double-surface printing mode on both sides of the recording sheet, respectively. Thereafter, the facsimile device operates such that printing is not executed when an image of an odd number page is received, and after an image of an even number page has been subsequently received, both images of the odd and subsequent even number pages are printed on the both surfaces of the recording sheet in the double-surface printing mode. It should be noted that when the last page of a transmitted document is an odd number page, the image of the last page is printed in the single-surface printing mode.

Incidentally, the facsimile data is created by a transmission source side, and it cannot be recreated at a transmission received side. Therefore, according to '264 publication, the received document (facsimile data) is stored for backup. If wrong recording sheets (e.g., recording sheets one side surface thereof already bearing some image: which will be referred to as a used recording sheet hereinafter) are set to the facsimile device and the double-surface printing is performed, the received image overlaps the printed image on the used recording sheet. Even in such case, if the back up data is stored, the received document can be re-printed on the correct recording sheets.

In '264 publication, in order to avoid a storage for storing the received facsimile data form being filled with backup data, a user is allowed to selectively delete images and/or the oldest backup data is automatically deleted.

According to '264 publication, however, since all the received image data is stored for backup, the storage is required to have a sufficient capacity, which causes increase of manufacturing cost. Although the facsimile device according to '264 publication is configured that the user can selectively delete the stored images, the capacity should be considerably large since the received data must be stored even if the user forget to delete the images.

Further, according to '264 publication, the oldest data is automatically deleted to save the capacity of the storage. However, according to such a configuration, since the image data which has been appropriately printed is still stored, the storage is not efficiently used.

SUMMARY OF THE INVENTION

In view of the above deficiency of the conventional facsimile device, the present invention is advantageous that there is provided an improved facsimile device capable of operating in the double-surface printing mode, which is configured to re-print the received image efficiently without increasing manufacturing cost.

According to aspects of the present invention, there is provided a facsimile device, which is provided with a storage configured to store image data of document data received by facsimile, a printing unit configured to print the image data stored in the storage in one of single-surface printing mode and double-surface printing mode on a recording sheet, the image data being printed on one surface and the other surface of the recording sheet subsequently when the printing unit operates in the double-surface printing mode, a backup memory configured to store only the image data to be printed on the other surface of the recording sheet, and a reprinting unit configured to reprint the image data stored in the backup memory in the single-surface printing mode.

According to the above configuration, only the image data which may be used for reprinting is stored in the backup memory, the capacity of the memory can be save and the manufacturing cost can be lowered. Further, the received image data can be reprinted efficiently.

According to other aspects of the invention, there is provided a facsimile device, which is provided with a storage configured to store image data of document data received by facsimile, a printing unit configured to print the image data stored in the storage in a single-surface printing mode and double-surface printing mode on a recording sheet, the image data being printed on one surface and the other surface of the recording sheet subsequently when the printing unit operates in the double-surface printing mode, a first deleting unit configured to delete first image data that is printed on the one surface of the recording sheet, a second deleting unit configured to delete second image data that is printed on the other surface of the recording sheet, the second deleting unit delete the second image data after the first deleting unit deletes the first image data.

According to the above configuration, unnecessary data is deleted immediately, the capacity of the storage can be saved and the manufacturing cost can be lowered.

BRIEF DESCRIPTION OF THE ACCOMPANYING DRAWINGS

Figure 8:
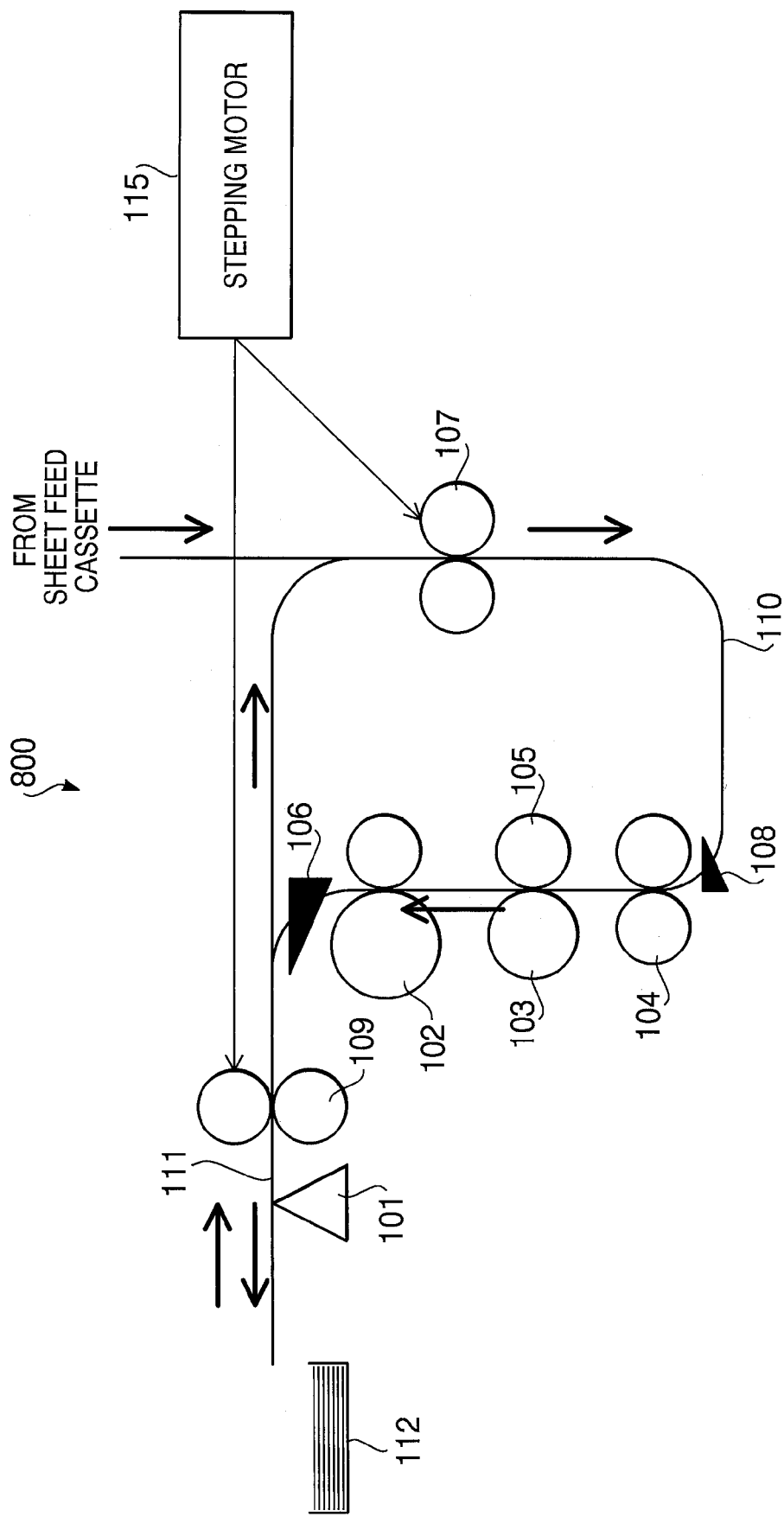

FIG. 8 schematically shows a configuration of a conventional double-surface printing facsimile device.

DETAILED DESCRIPTION

Hereinafter, a facsimile device 100 according to aspects of the present invention will be described with reference to the accompanying drawings. The facsimile device 100 is provided with a well-known double-surface printing mechanism as disclosed in '264 publication, and is capable of printing images on one surface or both surfaces of each recording sheet. It should be noted that the facsimile device 100 needs not be limited to a single-function device, but may also be implemented with scanner function, copier function and/or printer function.

Figure 1:
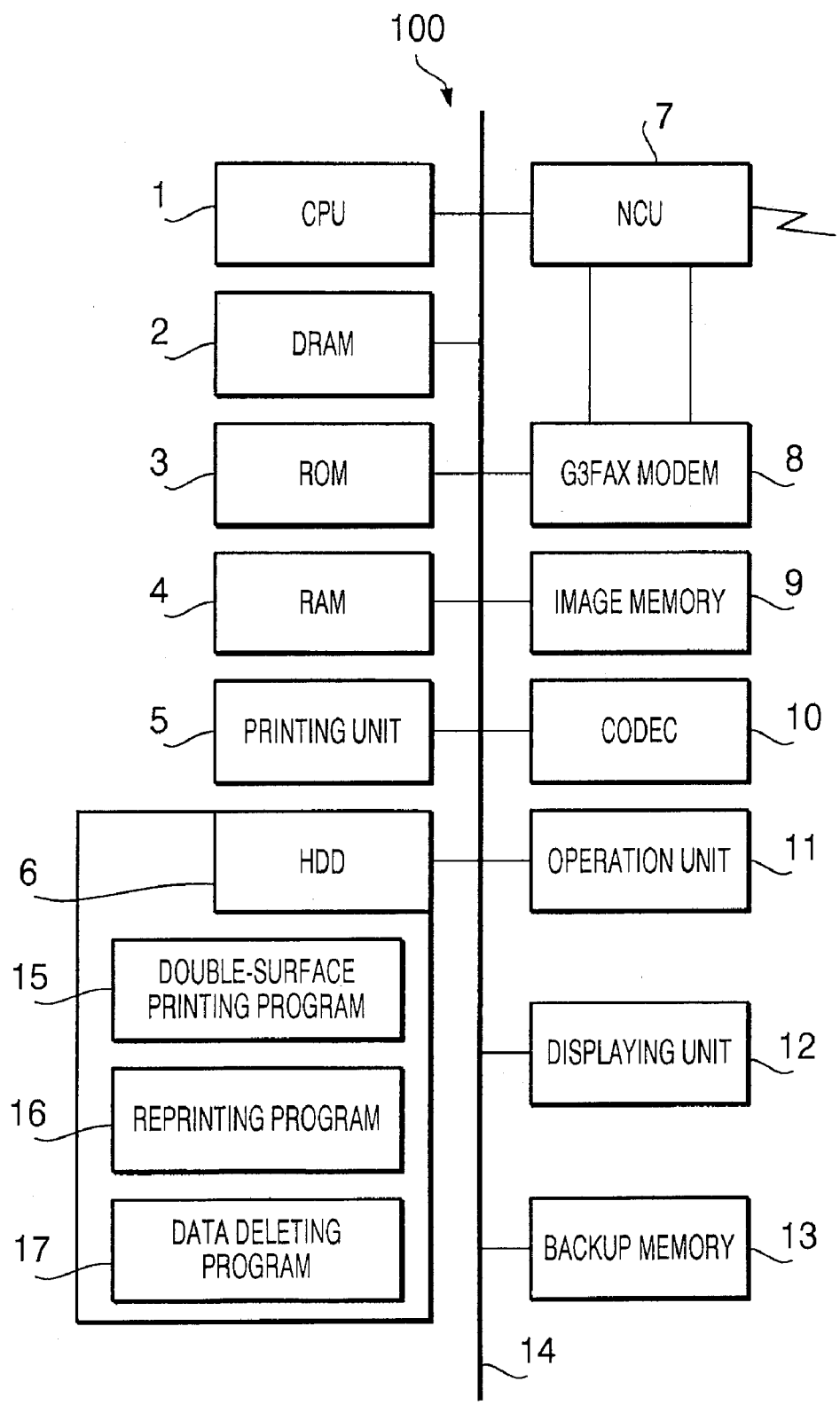
FIG. 1 is a block diagram showing an electrical configuration of a facsimile device in accordance with one or more aspects of the present invention.

FIG. 1 is a block diagram showing an electrical configuration of the facsimile device 100 according to an embodiment. The facsimile device 100 is provided with a CPU (Central Processing Unit) 1. The facsimile device 100 is further provided with DRAM (Dynamic Random Access Memory) 2, ROM (Read Only Memory) 3, RAM (Random Access Memory) 4, printing unit 5, HDD (Hard Disk Drive) 6, NCU (Network Control Unit) 7, G3FAX MODEM 8, image memory 9, CODEC 10, operation unit 11, displaying unit 12 and backup memory 13, which are interconnected through a system bus 14 so as to communicate with each other.

The CPU 1 controls respective units of the facsimile device 100 and a process of facsimile transmission/reception. The DRAM 2 is used as a storage for storing necessary data and functions as a work area when the CPU 1 executes programs. The ROM 3 stores programs and various pieces of data such as variable tables. The RAM 4 stores, in association with the image memory 9, programs retrieved from the HDD 6, and stores control parameters and registration data obtained through user operations. The printing unit 4 is configured to print image data, which is stored in the image memory, on the recording sheets at a predetermined resolution in a single-surface printing mode or a double-surface printing mode.

The HDD 6 stores programs which have been installed, and/or data stored therein. For example, the HDD 6 stores a double-surface printing program 15, a reprinting program 16 data deleting program 17 and the like.

The double-surface printing program 15 is used for controlling double-surface printing of image data received through a public telephone line network (i.e., by facsimile transmission) on both sides of the recording sheet (i.e., in the double-surface printing mode). The reprinting program 16 is used for controlling reprinting of the image data stored in the backup memory 13. The data deleting program 17 is used for controlling deletion of the image data stored in the backup memory 13.

The NCU 7 connects the facsimile device 100 to the public telephone line network and having an automatic calling function. The G3 FAX MODEM 8 realizes a modem function complying with Group 3 facsimile standard. The image memory 9 stores image data received from external facsimile devices and/or data to be transmitted to external facsimile devices.

The CODEC 10 is encoding and compressing image data and/or expanding the encoded data. The operation unit 11 is to be operated by a user and allows the user to input print settings, data registration operations and the like. According to the embodiment, the operation unit is provided with a plurality of key buttons and a touch panel. The displaying unit 12 is for displaying various types of data. According to the exemplary embodiment, the displaying unit 12 includes an LCD (Liquid Crystal Display).

The backup memory 13 is for storing image data for later use, when the printing unit executes the double-surface printing in which the printing unit prints an image on one side of the recording sheet, and thereafter, the printing unit prints another image on the other side of the recording sheet. The image data stored in the backup memory 13 is used when the printing unit reprints the image data.

Next, an operation of the facsimile device 100 will be described in detail.

The facsimile device 100 operates such that, when the NCU 7 detects an incoming call, the NCU 7 connects the G3 FAX MODEM 8 to the public telephone line network. After performing protocol exchanging session, the NCU 7 converts the compressed image data into digital signal with the G3 FAX MODEM 8, and stores the compressed data in the image memory 9.

When the received images are to be directly printed out, the CPU 1 retrieves the image data from the image memory 9, sends the same to the CODEC 10 to decode the retrieved image data and develops the image on a page memory on the DRAM 2. Then, the CPU 1 transmits the developed image data to the printing unit 5, thereby the image is printed on the recording sheet.

When the image is printed after the received image data is once stored in the image memory 9, the CPU 1 accumulatively stores the compressed image data in the image memory 9 during reception of the image data. After completion of the image reception, depending on the setting of the facsimile device 1, the CPU 1 executes the single-surface or double-surface printing using the image data stored in the image memory 9. The setting of single-surface/double-surface printing can be set using the operation unit 11.

When the single-surface printing is executed, the CPU 1 retrieves the image data stored in the image memory 9 for one page, transmits the same to the CODEC 10 for decoding, and develops the image in the page memory on the DRAM 2. Then, the CPU 1 transmits the developed image data to the printing unit 5, which prints the transmitted image on one side of the recording sheet.

When the double-surface printing is executed, the CPU 1 retrieves the image data stored in the image memory 9 for two pages, transmits the same to the CODEC 10 for decoding, and develops the images in the page memory on the DRAM 2. When the recoding sheet is discharged from the facsimile device 1 with its back side up, the CPU 1 retrieves the image data for the second page from the page memory 9 so that the image data of the second page is printed on one side of the recoding sheet. Thereafter, the CPU 1 retrieves the image data for the first page from the page memory 9, which is printed on the other side of the recording sheet.

Figure 2:
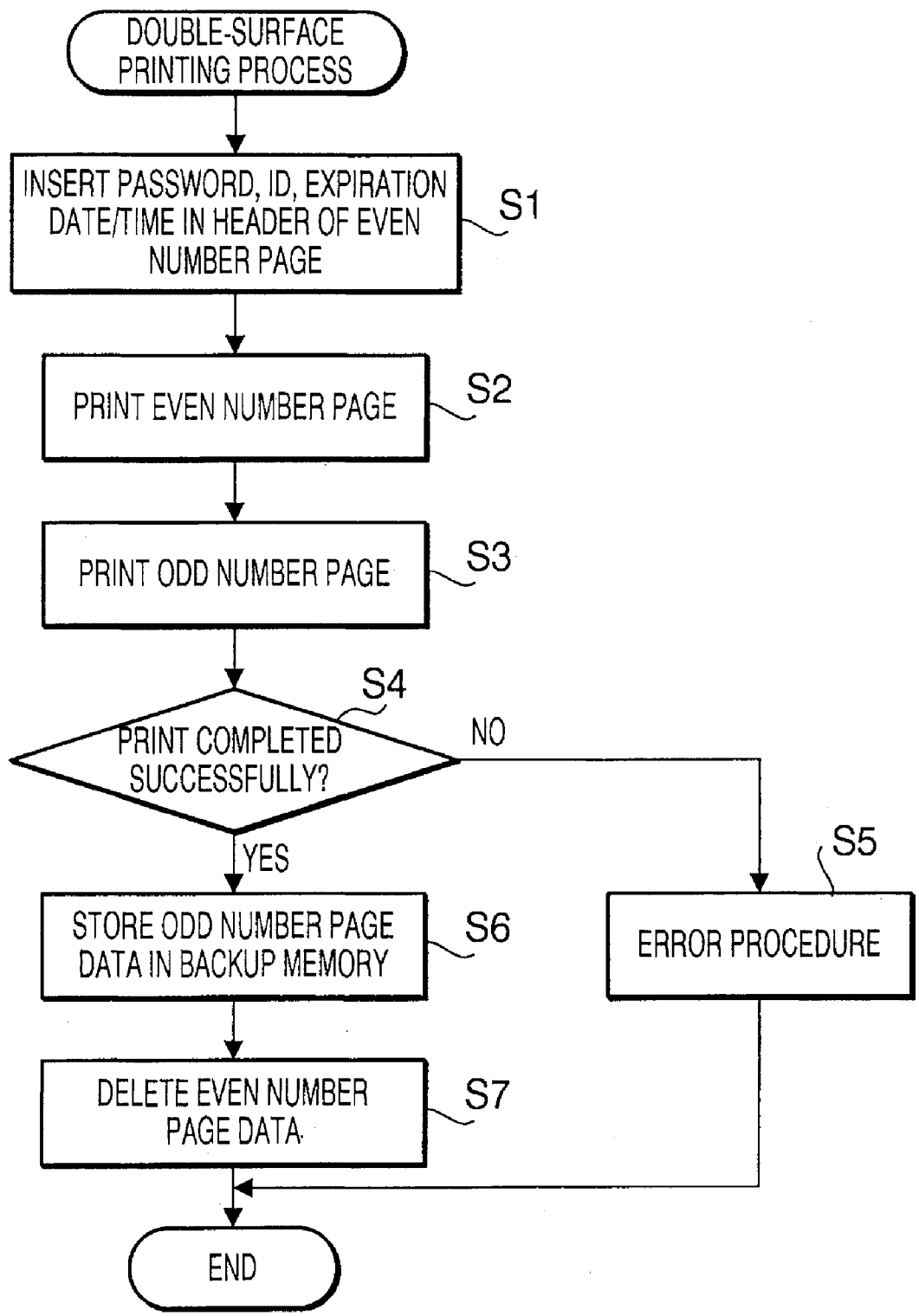
FIG. 2 is a flowchart illustrating a double-surface printing process which is performed when a double-surface printing program is executed.

FIG. 2 is a flowchart illustrating a double-surface printing process which is performed when the double-surface printing program 15 is executed.

The double-surface printing program 15 is executed in response to reception of the image data when the double-surface printing mode is set. Specifically, the double-surface printing program 15 is copied from the HDD 6 to the RAM 4, and executed by the CPU 1. According to the embodiment, the facsimile device 1 operates to discharge a recording sheet with its back side up, and image data for an even number page is printed on one side (i.e., front side) of the recording sheet, and the image data for an odd number page is printed on the other side (i.e., back side) of the recording sheet.

When the double-surface printing process starts, in S1, the process inserts a password, ID (identification) information and expiration date and time of storage in a header of the even number page of the image developed in the page memory on the DRAM 2. It should be noted that the "password" represents authorization of printing the subject image and assigned randomly. The "ID information" is assigned to the image data to identify the image data from other image data, and is assigned by the CPU 1 automatically. The "expiration date and time" are date and time by which the data is available. The image data stored in the image memory 9 or the backup memory 13 cannot be reprinted after expiration of the date and time. According to this exemplary embodiment, 12:00 p.m. of the day next to the day when the image data is received are the expiration date and time In S2, the process prints out the image of the even number page on one side (front side) of the recording sheet. Then, in S3, the process prints out the image of the odd number page on the other side (back side) of the recording sheet.

In S4, the process judges whether the printing in steps S2 and S3 has been successfully completed. If an error has occurred due to sheet jam or run out of sheet (S4: NO), the process executes an error processing (S5) by displaying an error message, outputting an error announcement or warning sound to notify the user of the occurrence of the error.

If the printing in steps S2 and S3 has been successfully completed (S4: YES), the process stores the image data of the odd number pages (which will be referred to as odd number page data hereinafter), which is likely printed out on the back surfaces of a used recording sheets, in the backup memory 12 (S6). The "used recording sheet" means a recording sheet to which a single-surface printing has been applied. Such a "used recording sheet" is sometimes used to save running cost since the one side of the "used recording sheet" does not bear an image and could be used for printing. It should be noted that, when the process stores the odd number page data, the password data, ID data and expiration data (data of expiration date and time) which are printed on the even number page, as well as the image data of the even number pages. In S7, the process deletes the image data for the even number pages (hereinafter, referred to as even number page data) which is not likely printed out on the back side of the used recording sheet. After deletion of the even number page data, the process finishes the double-surface printing process shown in FIG. 2.

If there is subsequent image data, the double-surface printing is repeated as above. If the last page of the image data is an odd number page, the process completes the printing of the last page in the single-surface printing mode. If the last page is the even number page, the process compotes the printing of the last page in the double-surface printing mode. With the above process, the recording sheets on which images are printed are discharged on the discharge tray 112 with their odd number pages oriented downward, the printed recording sheets being arranged in ascending order of their page numbers from down to top.

Figure 3:
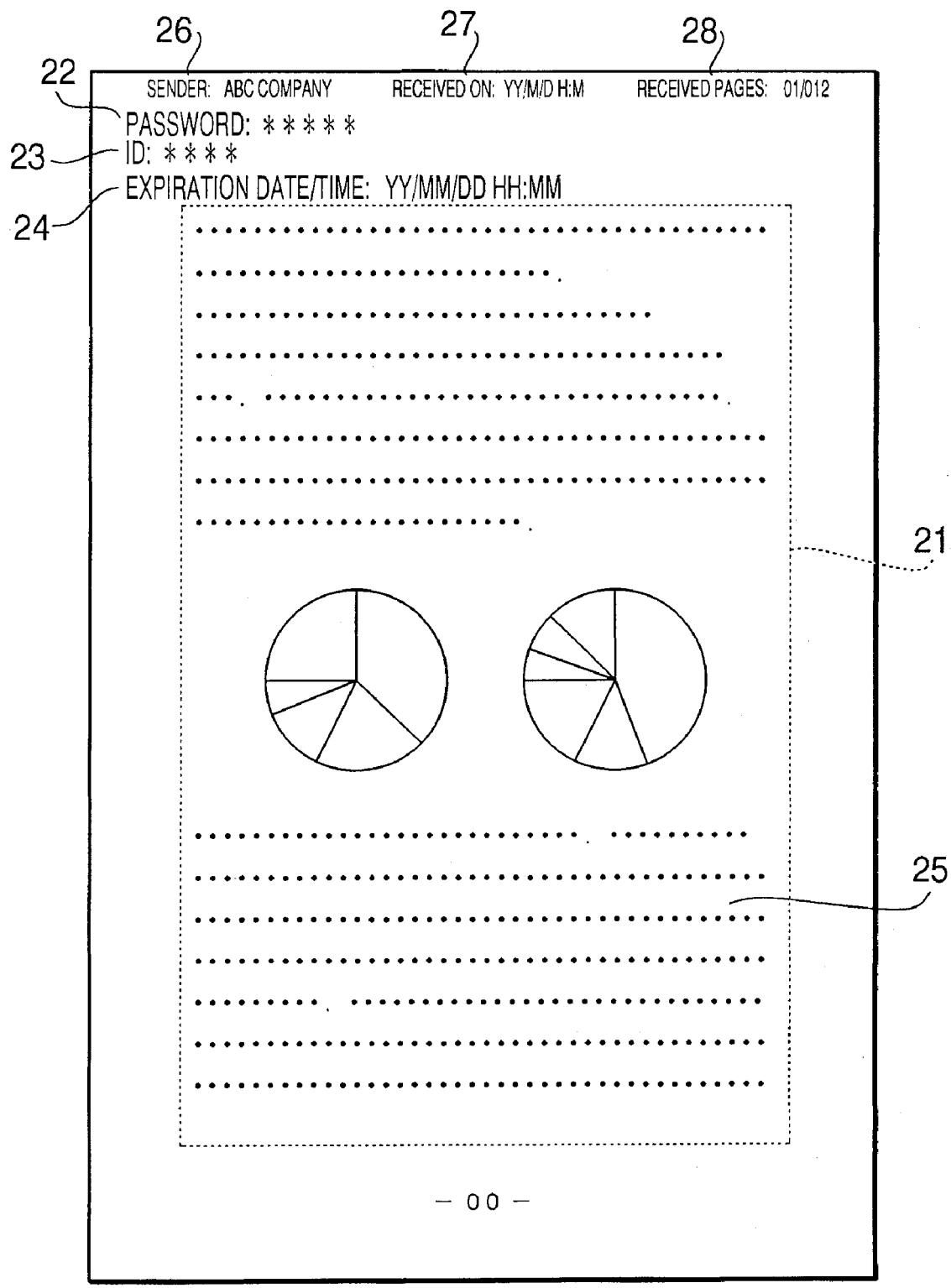
FIG. 3 shows an example of a printout when the double-surface printing process shown in FIG. 2 is executed.

FIG. 3 shows an example of a printout when the double-surface printing program 15 is executed (i.e., when the double-surface printing process is executed). As shown in FIG. 3, on a surface (of each recording sheet) on which the image is firstly printed (i.e., on the surface on which the even number page data is printed), a password indication area 22, ID indication area 23, expiration date and time indication area 24 are defined outside a printing frame 21, and the password, ID and expiration date and time are printed, respectively. Inside the printing frame 21, document data 28 is printed. Further, according to the embodiment, transmission source indication area 26, reception date and time indication area 27, received pages indication area 28 are defined outside the printing frame 21, and transmission source, reception date and time, and received number of pages are printed, respectively.

On the surface (of the recording sheet) on which the image is printed secondly (i.e., the surface on which the odd number page data is printed), only the printing frame 21 is defined and the document data is printed inside the printing frame 21. It should be noted that the "printing frame" 21 is a imaginary frame and is not printed on the recording sheet.

Incidentally, when the used recording sheets, which bear images on one side, are set to the sheet feed cassette (for example, to save the running cost), and the double-surface printing mode is set, if a new image is printed on the surface bearing a previously printed image, the two images overlap each other and the newly printed image may be illegible. The data received by facsimile was created by the transmission source side, and it cannot be recreated at the transmission reception side. According to the embodiment, in such a case, the image data stored in the backup memory 13 can be reprinted in accordance with the user's operation.

Figure 4:
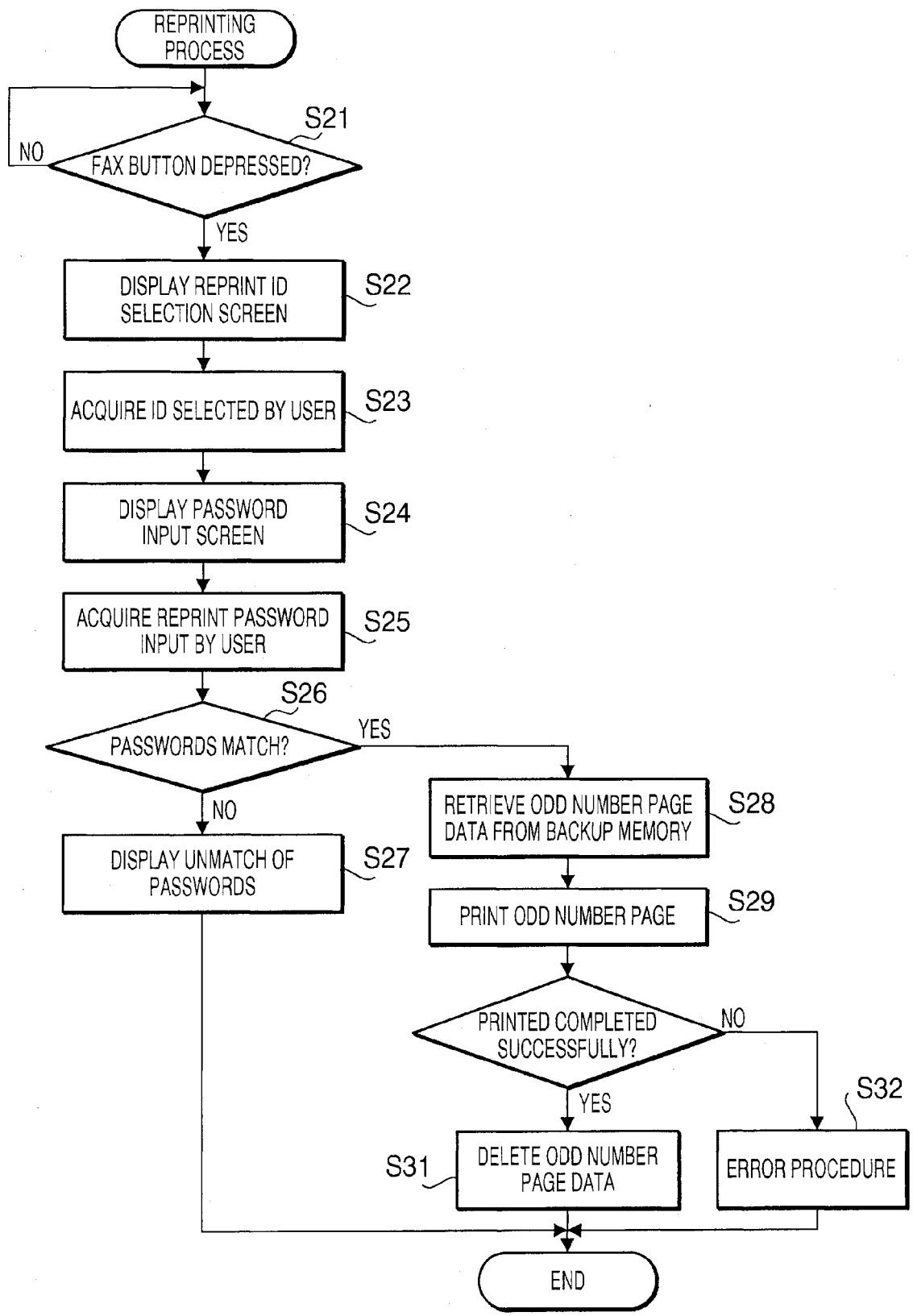
FIG. 4 is a flowchart illustrating a reprinting process which is performed when a reprinting program shown in FIG. 1 is executed.

FIG. 4 is a flowchart illustrating a reprinting process which is performed when the CPU 1 executes the reprinting program 16 shown in FIG. 1. Specifically, the reprinting program 16 is executed in response to user's operation of the operation unit 11 to input a reprinting command.

When the reprinting process starts, the process judges whether the user depresses the FAX button of the operation unit 11 (S21). If the user depresses the FAX button (S21: YES), the process displays an reprinting ID selection screen on the displaying unit 12.

Figure 5:
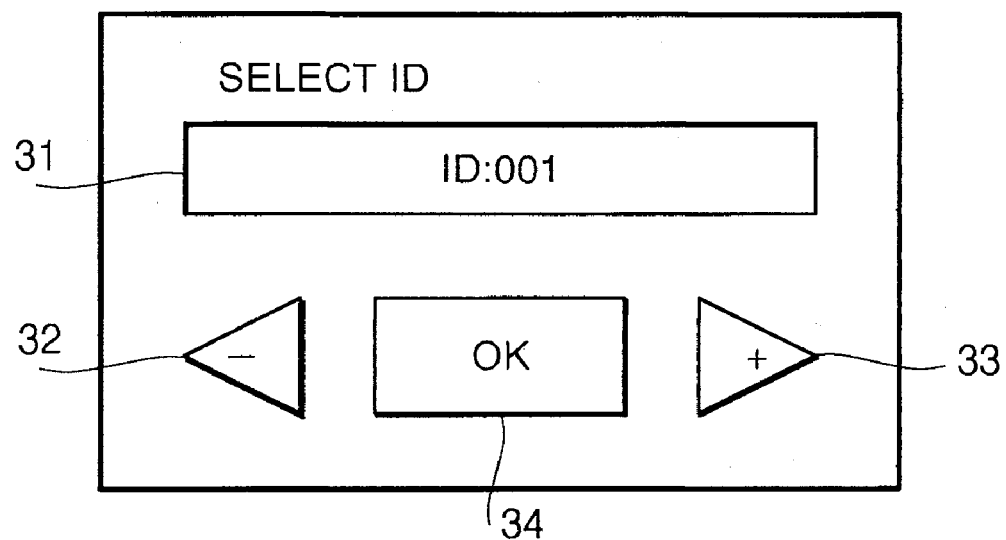
FIG. 5 is an example of a reprinting ID selection screen which is displayed when the reprinting process shown in FIG. 4 is executed.

FIG. 5 shows an example of the reprinting ID selection screen described above. As shown in FIG. 5, on the reprinting ID selection screen, an ID input area 31 in which an ID is input, a scroll buttons 32 and 33 for scrolling (subsequently displaying) IDs stored in the facsimile device 100, and an OK button 34 for determining the displayed ID as the selected ID. By operating the scroll buttons 32 and 33, the IDs, which are respectively assigned to the odd number pages, stored in the backup memory 13 are displayed on the ID input area 31 one by one. The user refers to the ID indication area 23 of the recording sheet on which the image to be reprinted, operates the scroll buttons 32 and 33 until the ID as referred to is displayed in the ID input area 31. When the desired ID is displayed in the ID input area 31, the user depresses the OK button 34. It should be noted that the ID needs not be assigned on a page basis, or may be set on a transmission basis.

When the user depresses the OK button 34, the process judges that the reprinting ID is selected in S23 of FIG. 4, and the process displays a password input screen in S24.

Figure 6:
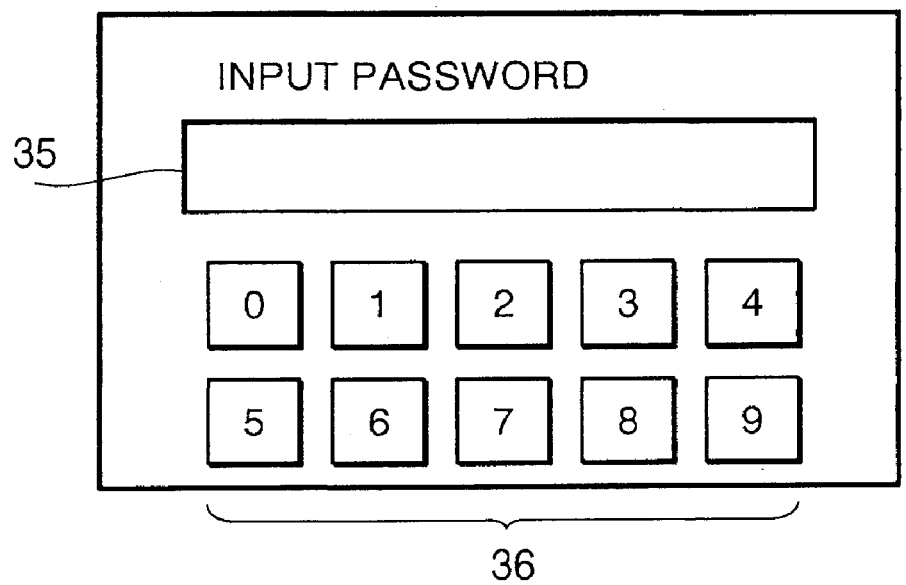
FIG. 6 is a password input screen which is displayed when the reprinting process shown in FIG. 4 is executed.

FIG. 6 shows an example of the password input screen displayed in S24. As shown in FIG. 6, the password input screen includes a password input area 35 and ten keys 36. The user is required to operate the ten keys 36 to input the password, referring to the password indication area 22 of the recording sheet on which the image data the user intends to reprint has been printed (S25).

When the password has been input, the process judges whether the input password matches the password of the odd number page data. That is, the process retrieves the password data corresponding to the odd number page identified by the ID, and compares the password input by the user with the retrieved password data. If the passwords do not match (S26: NO), the process displays an indication notifying that the passwords do not match on the display unit 12 (S27).

If the process judges that the passwords match (S26: YES), the process retrieves the odd number page data corresponding to the ID and password input by the user from the backup memory 13 and store the retrieved data in the RAM 4 (S28). Thus, based on the password input by the user, the process can judge whether the user is authorized to access the odd number page data stored in the backup memory 13.

In S29, the process transmits the odd number page data stored in the RAM 4 to the printing unit 5, and print the data in the single-surface printing mode. In S30, the process judges whether the printing in S29 was successfully completed. If the process judges that the printing has been successfully completed (S30: YES), the process delete the odd number page data, which has been printed in S29, from the backup memory 13, and finishes the reprinting process. If the printing has been failed due to sheet jam or the like (S30: NO), the process executes an error procedure (S32) in which an error message is displayed on the displaying unit 12 and/or warning sound or warning announce is output to notify the user of the occurrence of the error. After the error procedure is executed, the process finishes the reprinting process. It should be noted that, when the error has occurred, the odd number page data is not deleted from the backup memory 13.

As above, when the user reprints the odd number page data, it is automatically deleted from the backup memory. Therefore, the capacity of the backup memory 13 can be saved. If, however, the user does not execute the reprinting process for a relatively long period, or does not reprint at all, the odd number page data remains in the backup memory 13, and it may be possible that new data cannot be stored in the backup memory 13.

To avoid such a situation, according to the embodiment, the facsimile device 100 is configured such that the data of which the expiration date and time exceeds the current date and time, the data is automatically deleted from the backup memory 13.

Figure 7:
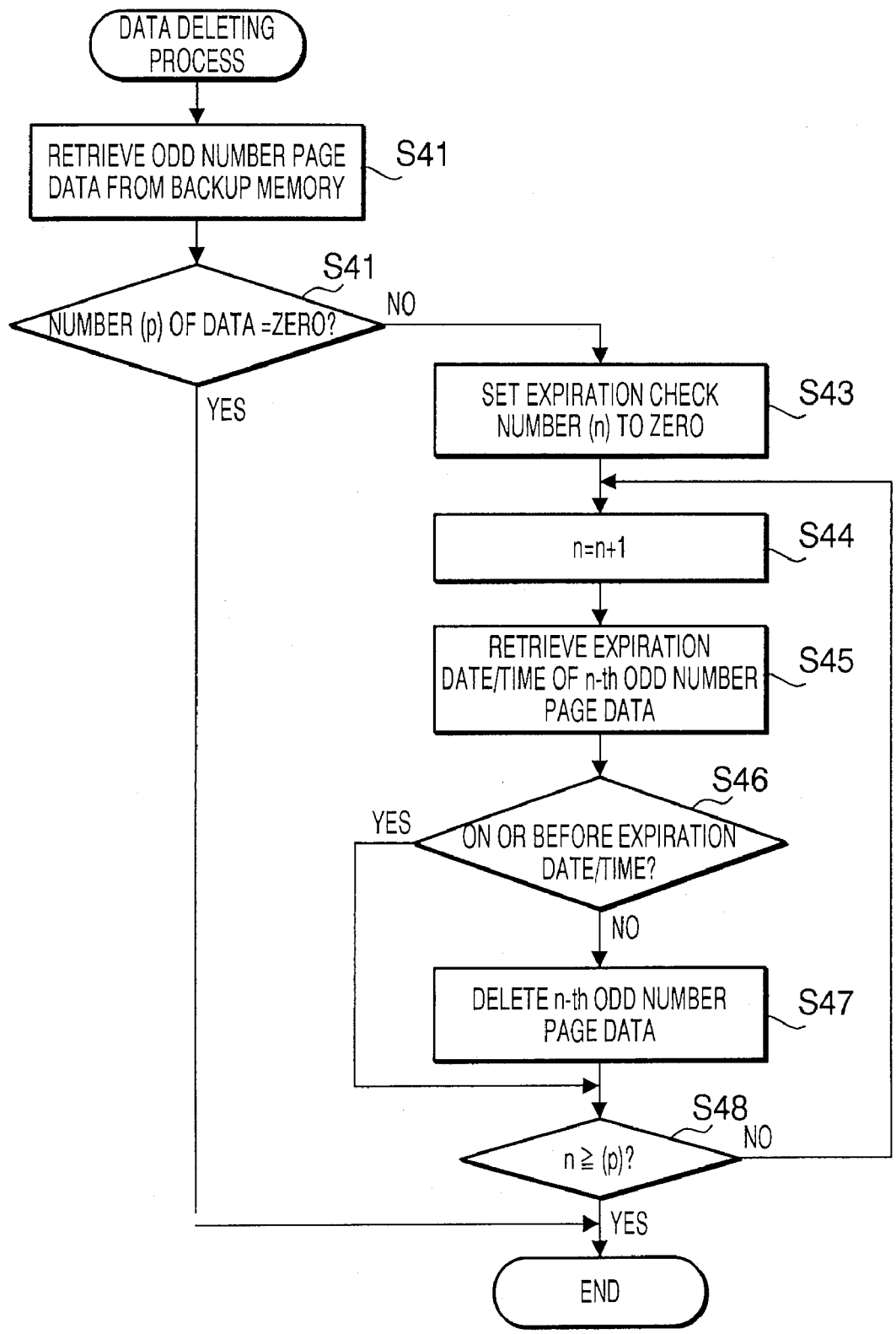
FIG. 7 is a flowchart illustrating a data deleting process which is performed when a data deleting program shown in FIG. 1 is executed.

FIG. 7 is a flowchart illustrating a data deleting process which is performed when the CPU 1 executes the data deleting program 17 shown in FIG. 1.

The data deleting program 17 is executed at every predetermined interval to manage the data stored in the backup memory 13. The timing, or the interval at which the data deleting program 17 is executed can be set to a desired interval by the user through the operation unit 11. According to the embodiment, as an example, the data deleting program 17 is executed at 12:00 p.m. (which is the end of a day) every day.

When the data deleting program 17 is executed (i.e., when the data deleting process starts), the process retrieves all the odd number page data stored in the backup memory 13 and copy the data in the RAM 4 (S41). Then, the process judges whether the number (p) of the pieces of the odd number page data copied to the RAM 4 is zero. If the number (p) is zero (S42: YES), there is no data to be deleted, and the process finishes the data deleting process.

If the number (p) is not zero (S42: NO), the process sets a expiration term check number (n) to zero in order to manage the number of the pieces of the expiration data (S43). Then, in S44, the process increment the number (n) by one, which will be referred to as the number of pieces of the expiration data having been checked.

In S45, the process retrieves an n-th piece of odd number page data from all the pieces of the odd number page data stored in the RAM 4, and obtains the expiration data (i.e., expiration date and time) included in the retrieved piece of the odd number page data. In S46, the process judges whether the currently examined piece of the odd number page data is within the expiration term by examining whether the obtained expiration date and time has passed the date and time at which the data deletion program 17 is being executed (which will be referred to as checking date and time).

If the checking date and time has not passed (i.e., on or before) the obtained expiration date and time, the process judges that the expiration term of the odd number page data has not expired, that is, the checking date and time is on or before the expiration term (S46: YES), and the process proceeds to S48. If the checking date and time has passed the obtained expiration date and time, that is, the checking date and time is not on or before (i.e., after) the expiration date and time (S46: NO), the process delete the n-th piece of odd number page data from the backup memory 13, and proceeds to S48.

In S48, the process judges whether the expiration check number (n) is equal to or greater than the number (p) of the pieces of data to check whether the expiration data has been examined for all the pieces of odd number page data copied to the RAM 4.

If the expiration check number (n) is not equal to or greater than the number (p) of pieces of the data (S48: NO), the process returns to S44, and examines whether the checking date and time has passed the expiration term of the next piece of the odd number page data.

If the expiration check number (n) is equal to or greater than the number (p) of the pieces of the data (S48: YES), there is no odd number page data remained in the RAM 4, which means that all the pieces of the odd number page data stored in the backup memory 13 have been examined. Therefore, in such a case, the process finishes the data deleting process.

The facsimile device according to the embodiment is configures such that, when printing the image data for the even number page stored in the image memory 9 is printed on one surface of the recording sheet, and then the image data for the odd number page stored in the image memory 9 is printed on the other surface of the recording sheet, the image data for the odd number page is stored in the backup memory 13 so that the reprinting of the odd number page data can be executed (see FIG. 4, S28 and S29). According to this configuration, the capacity of the storage can be reduced in comparison with a case where all the image data is stored for backup in the backup memory 13 and manufacturing cost can also be reduced. Further, only the odd number page data, which might be failed to be printed, is remained. Thus, the storage is used efficiently, and if the error occurs, the stored image can be used for reprinting.

According to the embodiment, when the double-surface printing is executed, the image of the even number page stored in the image memory 9 is printed on one surface of the recording sheet, and thereafter, the image of the odd number page is printed on the other surface of the recording sheet. In this case, the image data of the even number page is deleted first (see FIG. 2, S7) and then, the image data of the odd number page is deleted (see FIG. 4, S31). Therefore, in comparison with a case where the all the image data is stored in the backup memory 13, the capacity of the backup memory 13 can be small, which achieves relatively low manufacturing cost. Further, the image data of the even number page, which may not be failed in printing, is deleted first, and the image data of the odd number page, which may be failed in printing, is deleted later, the received image data can be stored efficiently and reprinting can be performed.

Further, according to the embodiment, when the reprinting is performed, the user is required to input the ID and password which are printed on the recording sheet when the double-surface printing is performed (see FIG. 3) in order to judge whether the user is authorized to access the backup image data (see S23-S25 of FIG. 4). Therefore, according to the embodiment, reprinting or deletion of the backup image data is delete by an unauthorized person can be prevented. Further, since the storage expiration date and time is printed together with the even number page data when the double-surface printing is performed, the user can recognize the term within which the reprinting should be or can be executed.

According to the embodiment, the ID, password, and the storage expiration date and time are printed on one side (i.e., front side) of the recording sheet together with the image data of the odd number page. Since printing of the even number page is less likely to be failed when the double-surface printing is executed, the ID, password and expiration date/time of the image to be reprinted do not overlap the image of the used recording sheet, and can be recognized easily.

According to the embodiment, the expiration date and time is the date and time when the image data is deleted (see S46 and S47 of FIG. 7). Thus, image data unnecessary for reprinting is automatically deleted from the backup memory 13 or image memory 9, which is advantageous in that the memory capacity can be made small.

The facsimile device 100 described above is an exemplary embodiment, and the invention should not be limited to the configuration described above. Rather, various modification can be made according to aspects of the invention.

For example, in the above-described embodiment, the images of the even number page and the odd number page are printed in this order in the double-surface printing mode, and the recording sheet is discharged with its back side oriented upward (i.e., face-down discharge). It is also possible to print the images of the odd number page and even number page in this order, and discharge the recording sheet with its front side oriented upward (i.e., face-up discharge). In such a case, the recording sheets are stacked such that pages having larger page numbers are printed and discharged on the discharge tray and pages have smaller page numbers are printed and discharged later. In this case, the image data of the even number pages should be stored in the back up memory 13 so as to be used for reprinting. Further, the image data of the even number pages are to be deleted from the backup memory 13 or the image memory 9 when the reprinting is performed.

According to such a configuration, similarly to the above-described embodiment, the capacity of the memory can be made smaller. Further, in the modified configuration, the password, ID and expiration date and time may be printed on the recording sheet together with the odd number page data. According to this modification, even if the used recording sheet is set and the double-surface printing is performed, the password, ID and the expiration date and time may not overlap the printed image on the used recording sheet, and can be recognized by the user easily.

According to the facsimile device 100 described above, the password, ID and expiration date and time are printed on the surface on which the image is printed firstly. Instead of this configuration, the process is modified to print such information on the surface of the recording sheet on which the image is printed secondly (i.e., on the backside). In this case, the password, ID and expiration date and time may be printed outside the print frame 21 so that such information does not overlap the image printed on the used recording sheet. Alternatively, the password, ID and expiration date and time may be printed both sides of the recording sheet.

What is claimed is:

1. A facsimile device, comprising:
   a storage configured to store image data of document data received by facsimile;
   a printing unit configured to print the image data stored in the storage in either a single-surface printing mode or a double-surface printing mode on a recording sheet having a first surface and a second surface, wherein the printing unit is further configured to:
   print on the first surface of the recording sheet when in the single-surface printing mode, and
   print a first portion of the image data on a first surface of the recording sheet and a second portion of the image data on a second surface of the recording sheet when in the double-surface printing mode; and
   a backup memory configured to store, of the first and second portions of the image data, only the second portion of the image data to be printed on the second surface of the recording sheet;
   wherein the printing unit is further configured to reprint the second portion of the image data stored in the backup memory in the single-surface printing mode in response to a reprint request.

2. The facsimile device according to claim 1,
   wherein the printing unit is configured to print ID information and password assigned to the image data, and expiration date and time for reprinting the image data stored in one of the backup memory and the storage on the recording sheet together with the image data.

3. The facsimile device according to claim 2,
   wherein the printing unit prints the ID information, password and expiration date and time on the first surface of the recording sheet.

4. The facsimile device according to claim 2,
   wherein the expiration date and time represents a date and time at which the image data is to be deleted.

5. The facsimile device according to claim 2,
   wherein the printing unit is configured to identify image data to be reprinted based on the ID information and password.

6. The facsimile device according to claim 1, further comprising:
   at least one processor; and
   memory operatively coupled to the at least one processor that, when executed, cause the facsimile device to:
   delete the image data stored in the storage in response to determining that the second portion of the image data is stored in the backup memory.

7. A facsimile device, comprising:
   a storage configured to store image data of document data received by facsimile;
   a printing unit configured to print the image data stored in the storage in either a single-surface printing mode or a double-surface printing mode on a recording sheet, wherein the printing unit is configured to print a first portion of the image data on a first surface of the recording sheet and a second portion of the image data on a second surface of the recording sheet when the printing unit operates in the double-surface printing mode;
   a backup memory configured to store, of the first and second portions, only the second portion of the image data;
   at least one processor; and
   memory operatively coupled to the at least one processor and storing computer readable instructions that, when executed, cause the facsimile device to:
   delete the first portion of the image data that is printed on the first surface of the recording sheet; and
   delete the second portion of the image data that is stored in the backup memory after deleting the first portion of the image data.

8. The facsimile device according to claim 7,
   wherein the printing unit is configured to print ID information and password assigned to the image data, and expiration date and time for reprinting the image data stored in one of the backup memory and the storage on the recording sheet together with the image data.

9. The facsimile device according to claim 8,
   wherein the printing unit prints the ID information, password and expiration date and time on the first surface of the recording sheet.

10. The facsimile device according to claim 8,
    wherein the expiration date and time represents a date and time at which the image data is deleted.

11. The facsimile device according to claim 7,
    wherein the printing unit is further configured to reprint the second portion of the image data stored in the backup memory in the single-surface printing mode in response to a reprint request.

12. A method of reprinting image data by controlling a double-surface printing facsimile device, comprising the steps of:
    printing the image data of document data received by facsimile on a recording sheet, a first portion of the image data being printed on a first surface of the recording sheet and a second portion of the image data being printed on the second surface of the recording sheet;
    storing, of the first and second portions of the image data, only the second portion of the image data printed on the second surface of the recording sheet; and
    reprinting the stored second portion of the image data which was printed on the second surface of the recording sheet in response to a reprint request.

* * * * *